Nov. 12, 1935.   H. ERNST   2,020,773
DEFLECTION VARIATOR
Filed Nov. 15, 1930
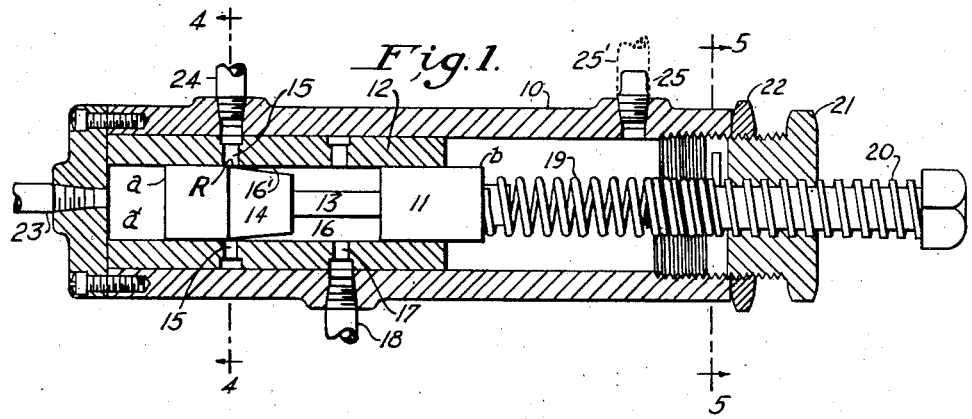
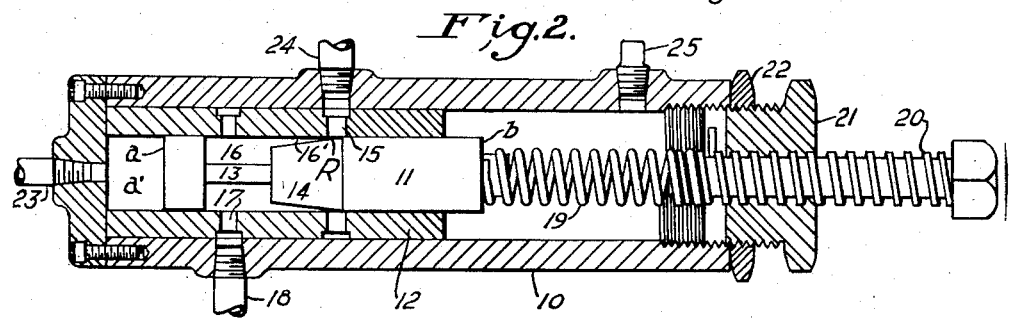
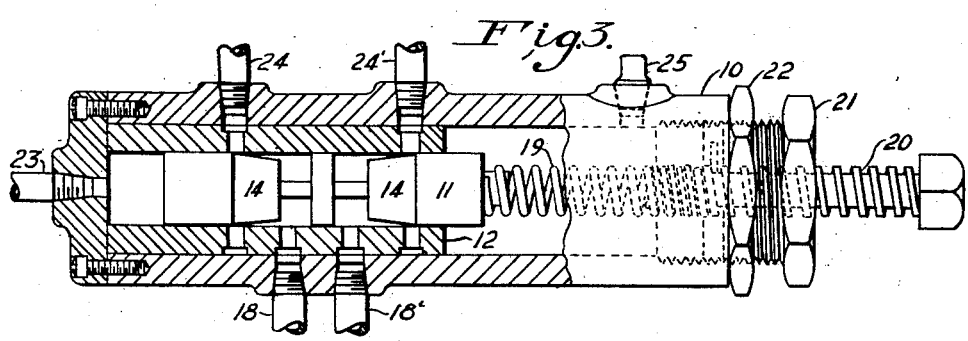
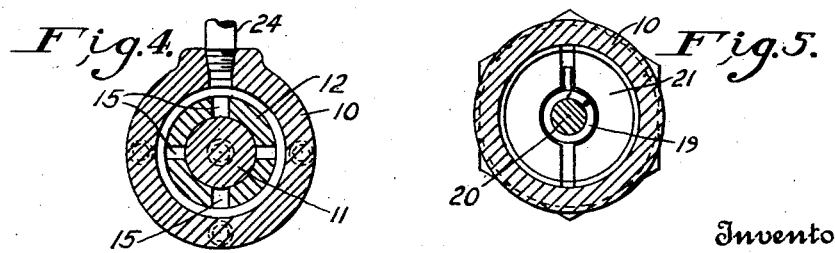
Inventor
Hans Ernst
By Attorneys
Nathan & Bowman Patented Nov. 12, 1935

2,020,773

UNITED STATES PATENT OFFICE 2,020,773

DEFLECTION VARIATOR

Hans Ernst, Cincinnati, Ohio, assignor to The Cincinnati Milling Machine Company, Cincinnati, Ohio, a corporation of Ohio Application November 15, 1930, Serial No. 495,947

12 Claims. (Cl. 137—153)

This invention relates to spring control means and has for its primary object to provide an improved means for producing an adjustable relation between load and deflection in mechanisms where it is necessary to vary the rate of change of movement of an element with respect to the rate of change in an applied force.

A typical application of this device is to the movement regulating means for fluid control valves and particularly for that type of valve which automatically adjusts the size of the orifice in accordance with variations in the pressure of the fluid in the supply or discharge line or line independent therefrom. In such an application it will provide a form of valve structure which may be readily adjusted for operation under a variety of pressure conditions and which will thereafter automatically control a flow of fluid from one source to another in accordance with variations in pressure.

A further object of this invention is to provide a regulating valve with means for initially adjusting the cross-sectional area of the orifice to permit a predetermined flow therethrough under given conditions of pressure and which will automatically vary the size of the opening, to vary the orifical velocity of the regulated fluid, upon a variation from the predetermined pressure condition, and as a further refinement to so construct and arrange the ports and valve members that the flow of fluid therethrough will be in a direction tending to eliminate the possibility of erosion of the seat and of small particles collecting within the valve or clogging the openings thereof.

Still another objective of this invention is to provide a valve structure which may be readily converted from one type of valve to another type according to the purpose for which it may be required and which will regulate a flow of fluid according to variations in pressure values.

In carrying out the objects of this invention, I have constructed a valve having a cylindrical bore within which a sliding valve-piston element is moved axially by pressure fluid in opposition to a variable yielding element, to restrict or enlarge the valve openings in accordance with variations in pressure, with a view toward regulating a flow of fluid in accordance with any variations in pressure, and which may be adjusted to operate over a greater or lesser range of pressures or flows according to the results desired to be maintained. The ports and passageways for the flow of fluid are so arranged with respect to the movement and configuration of the valve-piston that fluid passes from the restrictable orifice through a passageway increasing in cross-sectional area thereby immediately reducing the velocity of flow and eliminating the probability of small particles of foreign matter carried by the fluid from becoming clogged about the variable orifice or otherwise interfering with the proper functioning and flow through the valve.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawings depicting a preferred typical construction of its application to fluid control valves have been annexed as a part of this disclosure and, in such drawing, like characters of reference denote corresponding parts throughout all the views, of which:—

Figure 1 represents a structural embodiment of this invention illustrating the parts arranged for decreasing the flow as the pressure increases. Fig. 2 illustrates the valve with the position of the valve plunger reversed so that the flow increases with an increase in pressure. Fig. 3 illustrates an adaptation of the structure for controlling a flow through a plurality of conduits. Fig. 4 is a sectional view taken along line 4—4 of Fig. 1. Fig. 5 is a sectional view taken along line 5—5 of Fig. 1.

Referring to Fig. 1, the valve unit comprises a casing or housing member 10 within which is slidingly fitted a valve piston element 11. An annular grooved and ported sleeve member 12 provides the bearing surfaces for the piston and is pressed or otherwise secured within the casing, or if desired, may be made integral therewith.

Intermediate the ends of the piston element, a reduced portion 13 is formed having a side 14 thereof suitably tapered so as to coact with inlet holes 15 to effect valve action upon the movement of the piston. Thus, fluid entering the unit through line 24, passes around an annular groove in the sleeve and fills the holes 15. The resistance to the flow of the fluid into chamber 16 is determined by the position of the valve portion 14 of the piston 11, if the latter is moved to a position opening the orifices 15 the fluid passes into the chamber and out port 17 and line 18 in quantities determined approximately by the formula $$Q = \frac{P}{R}$$

where P represents the pressure drop across the lines 24 and 18, and R represents the resistance offered by the valve. By varying either the resistance or pressure, the quantity of fluid passing through the valve may be regulated at will.

This invention proposes to vary the resistance to flow by means of pressure fluid, taken either from line 24 or 18, or from an independent source, delivered to chamber $a'$ through conduit 23 and which reacts against area $a$ of the piston in opposition to the action of a coiled spring 19. Inasmuch as the deflection of a spring is directly proportional to the load, provided that the limit of the material is not exceeded, a unit variation in the actuating pressure will shift the piston a unit distance, and if the design of the spring be such that under a normal load or a given load the valve portion 14 of the piston will be caused to take up a position with respect to the opening 15 so as to permit predetermined quantities of fluid to pass, any variation in the pressure of the actuating fluid will produce a corresponding change in the resistance R and permit a greater or lesser amount of fluid to pass. Should chamber $a'$ be connected with line 24, variations in the pressure of the supply fluid automatically regulates the size of the valve orifice. Similarly if line 18 connects with the chamber $a'$, variations from a preselected pressure desired to be maintained in the discharge conduit, will effect variations in the resistance R.

Knowing that erosion of valve elements is due chiefly to high velocity of the flow and the presence of particles of foreign matter carried by the fluid it will therefore be seen that I have largely overcome this undesirable condition by constructing a tapered valve portion 14 which coacts with the straight side walls of the sleeve 12, and which, not only permits flow regulation to a nicety, but tends toward the immediate reduction in the velocity of the fluid with a consequent reduction in the scoring area of the valve seat. The tendency of particles of solids carried by the fluid to collect at the opening and interfering with the proper functioning of the valve is also eliminated, due to the fact that the fluid passing the resistance passes through a channel 16' of increasing cross-sectional area, in any position of the valve, and thus, particles are dislodged and carried away from the opening as fast as they collect.

In order to vary the effect of unit variations in pressure upon the movement of the piston element, means are provided in the form of a screw threaded shaft 20 for varying the characteristics of the spring 19. The lead of the thread is cut so as to interfit with and match the spacing of the coils of the spring preferably when compressed under an initial or normal load. Movement of the screw inwardly decreases the number of "live" coils of the spring thereby to decrease the deflection value thereof for a given increase in load, or in other words, to require a greater increase in load to shift the piston a unit distance, and conversely. A movement of the screw outwardly so as to increase the number of active coils of the spring, decreases the load required to shift the plunger a unit distance, or to effect an increase in the gap or orifice for a unit variation in load. Obviously, by making the pitch of the screw different from the pitch of the spring we may obtain the combined effect of a change in the spring characteristic and a change in the initial position of the valve plunger.

For changing the initial position of the plunger without changing the characteristic of the spring 19 the screw 20 may be mounted in the adjusting nut 21. Turning of the nut 21 moves the adjusting screw, spring and plunger as a unit with respect to the openings in the sleeve or casing, thereby to vary the initial value of the orifice for a preselected pressure condition.

As an illustration of the foregoing, it may be desirable to permit a given flow through the valve under a given or normal condition of pressure, and then automatically regulate the flow proportionately to variations in that pressure. To accomplish this result the adjusting nut 21 is first adjusted to give the required initial or normal flow through the valve, and then the screw 20 is adjusted in order to vary the effectiveness of the spring 21 and thus the variation in size of the orifice for given variations in pressure and without affecting the initial adjustment. Under normal conditions of pressure, a predetermined quantity of fluid will then pass the resistance R but if there occurs a change in the pressure, likewise will there be a change in the value of the resistance and the quantity of fluid passed.

Other installations or application of the unit may require an altogether different setting of the elements which may be readily effected as above explained.

Certain applications of the valve may require that it be responsive to variations in pressure differentials and in this event the plug 25 is removed from the casing and a pressure conduit 25' (shown in dotted lines) connected therewith for exerting an additional force against area $b$ of the piston 11, a suitable stuffing box (not shown) being provided to prevent leakage of fluid about the members 20 and 21. The forces tending to move the valve in one direction are $P_a$, and the opposing forces then become $P_b$ plus the force of the spring 19. In this manner the size of the orifice 15 and the flow through the unit regulated in accordance with variations in potentials of a plurality of lines.

Obviously, various other types of pressure responsive valves may be constructed, according to their intended use and result desired, by a simple rearrangement of the conduits and/or by reversing or substituting a different valve piston. By way of further illustration, Fig. 3 represents a form of valve which regulates the flow through two lines, 24 to 18 and 24' to 18', simultaneously in accordance with variations in pressure which may be taken from either of the controlled lines or from a line independent thereof.

Without further analysis the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A balanced valve for controlling the rate of flow of a liquid through a conduit comprising, a valve casing provided with a central bore and an intake and an out-take conduit intersecting said bore; a valve plunger slidable within the bore in said casing, said plunger having a reduced valve portion formed intermediate its ends and arranged to provide a passageway between the walls of said bore and valve portion diverging in the direction of flow between the intake and out-take conduits; fluid pressure means acting upon said plunger at a point isolated from said valve portion for shifting said valve with respect to the intake port thereby to control the rate of flow therethrough; a coiled spring element engaging said plunger and adapted to offer a normally fixed and uniform resistance to the movement thereof by said fluid pressure means; means comprising a nut interlocked with one end of said spring for rotating and simultaneously varying the tension thereof; and means for varying the unit value of the resistance offered by the said spring and thereby the degree of movement of said valve plunger for a unit variation in the pressure of said fluid pressure means comprising a shaft member having a thread-like connection with said spring and a threaded connection with said nut, the parts being so constructed and arranged that either the nut or the shaft may be turned to vary the characteristics of said spring without disturbing the setting of the other.

2. An hydraulic valve for controlling the flow of a liquid comprising, a valve casing provided with a plurality of fluid conduit connections including an intake and an out-take conduit; a valve plunger slidable within said casing for regulating the rate of flow through the valve, said plunger having a reduced cone-shaped portion forming a valve core intermediate its ends and arranged with respect to said bore to provide a passageway diverging in the direction of flow between the intake and exhaust conduits; fluid pressure means acting upon said plunger at a point isolated from said reduced portion for shifting the valve portion of said plunger with respect to the intake port; a resistance element adapted to offer a normally fixed and uniform resistance to the movement of said element for each unit variation in pressure of said fluid pressure means; and means for varying the unit value of the resistance offered by the said element thereby to control the degree of movement of said valve plunger for any predetermined variation in the pressure of said fluid pressure means.

3. A balanced valve structure for controlling automatically the flow of a liquid in accordance with variations in the pressure of the controlled liquid combining, a casing member provided with inlet and outlet ports; a valve plunger movable within said casing, said plunger having a valve portion adapted in various positions to open or close communication between said inlet and outlet ports; means comprising a cylinder and piston element hydraulically isolated from said valve portion for moving said valve plunger with respect to said inlet and outlet ports, said means being connected with the liquid undergoing control whereby said piston and valve plunger are caused automatically to assume new positions in direct proportion to changes in the pressure of the controlled liquid; and means operative to vary the degree of valve movement effected by a unit variation in said liquid pressure thereby to render said valve structure operative to effect any given change in flow for a predetermined change in said pressure.

4. A balanced valve structure adapted to control automatically the rate of flow of oil, in accordance with changes in the pressure of the oil, comprising a valve casing provided with oil inlet and outlet ports; a plunger element movable in said casing, said plunger element having a valve portion formed intermediate its ends adapted to control the flow of oil from said inlet port to said outlet port, and a piston portion located remote from said valve portion; a power cylinder for said piston portion; a conduit connecting said cylinder with one of said ports for conveying oil under pressure to said cylinder to actuate said plunger element in one direction; spring means for opposing the movement of said plunger by uniform increments, said spring being of a value such that under a given condition of oil pressure the valve portion of said plunger assumes a predetermined position with respect to said inlet and outlet ports; and means operable to vary the deflection characteristics of said spring so that the degree of movement of said plunger for each unit change in oil pressure away from said given condition of oil pressure may be varied to suit different conditions.

5. A balanced control valve for liquids combining a casing member having inlet and outlet ports formed therein; a valve plunger having a portion adapted to coact with said ports to provide a regulatable passageway between said ports, said passageway increasing in every major dimension downstream; fluid actuated means located remote from said passageway for actuating said plunger in one direction comprising a cylinder, a piston slidable therein and connected with said plunger, and a conduit for conveying pressure fluid to said cylinder; spring means for opposing said movement of said valve plunger; said spring being adapted normally to impose a uniformly increasing force of a given normal value on said plunger during said movement; means for initially adjusting said spring so that under a given condition of pressure in said cylinder said valve plunger will assume a predetermined position with respect to said inlet port; and means operative to change the deflection characteristics of said spring to render same operative to thereafter impose on said valve plunger a uniformly increasing force of a different normal value, said last mentioned adjustment being effected without changing the said initial adjustment.

6. A device for changing the deflection characteristics of a spring so as to render same operative to offer a uniformly increasing resistance of different normal values for a unit change in the load placed thereon, comprising a compression spring adapted normally to support more than the load to be placed thereon; screw means cooperating with the end of the spring remote from the said load for placing an artificial load thereon and compressing said spring a predetermined distance; means adapted under one condition of operation to apply a predetermined load on said spring equal to said artificial load and under another condition to apply a variable load on said spring; and a second screw means having a threaded connection with said spring and with said first mentioned screw means for varying the number of active coils in said spring thereby to render said spring capable of yielding any one of a plurality of predetermined units of distance for each unit change in the load placed thereon, each of said screw means being so constructed and arranged as to be capable of adjustment without disturbing the setting of the other.

7. A device for changing the deflection characteristics of a spring so as to render same operative to be deflected under one condition of operation to a given point upon the application of a predetermined load and thereafter to be deflected by uniform increments of any prescribed amount for each unit change in the value of load placed thereon comprising, a coiled spring element; means under one condition applying a predetermined load upon one end of said spring thereby to deflect said spring to a given point; screw means interlocked with the other end of said spring for rotating said spring and simultaneously adjusting the relative position of the said given point of deflection; a second screw means having a threaded connection with said spring and with said first mentioned screw means and adapted for movement relative to said first mentioned screw means for varying the number of effective coils in the said spring thereby to render said spring thereafter capable of being deflected by uniform increments of any preselected amount upon a change in said predetermined load, the parts being so constructed and arranged that either of said screw means may be adjusted without disturbing the setting of the other.

8. A control device combining, a valve casing provided with inlet and outlet ports; a valve element within said casing, said element and casing being so constructed and arranged with respect to said ports that the direction of flow of fluid is from a restrictable orifice to an unrestricted orifice through a passageway which increases in every major dimension down-stream; means actuated by the pressure of the fluid being controlled and acting upon said valve element at a point isolated from said passageway for actuating said valve element in one direction; resilient means adapted to impose a uniformly increasing force upon said valve element in opposition to unit increases in the pressure of the controlled fluid; means for varying the initial pressure required in overcoming said resilient means and to move said valve element through a given distance; and means for varying the effect of a unit change in pressure subsequently occurring upon the degree of movement of said valve element.

9. A balanced rate control valve structure combining, a casing member and an adjustable valve plunger; inlet and outlet ports in said casing; said plunger and casing being so constructed and arranged with respect to said ports that the direction of flow is from an orifice of given cross-sectional area toward one of equal or larger area through a passageway which increases in every major dimension toward said larger orifice, means actuated by the pressure of the fluid being controlled and acting upon said valve plunger at a point isolated from said ports for shifting said plunger relative to said ports thereby to effect valve action and consequent variations in the flow through the valve in proportion to variations in said pressure; spring means for uniformly opposing the movement of said plunger under the action of said fluid pressure, means for varying the initial tension of said spring; and means separate from said spring tensioning means for varying the effective length of said spring thereby to vary the increment of movement of said valve plunger for a given change in fluid pressure subsequently occurring.

10. A valve mechanism for controlling the rate of flow of fluid through a conduit, combining; a casing element provided with an inlet and an outlet port; a cone shaped piston member for regulating the rate of flow of the fluid from one of said ports to the other, said cone-shaped member cooperating with said ports to provide a passageway therebetween which diverges in the direction of flow; fluid pressure actuating means insolated from said ports for urging said piston member in one direction; resilient means for controlling the increment of movement of said member in direct proportion to unit variations in the pressure of said actuating means; means for controlling the value of the pressure required to effect an initial movement of said piston member a predetermined distance with respect to said ports; and means for varying the effect of a unit change in pressure subsequently occurring upon the increment of movement of said piston element without changing the initial relation between said piston member and said ports.

11. A valve mechanism adapted for controlling a flow of fluid combining, a casing member provided with inlet and outlet ports; a plunger element reciprocably mounted therein, said plunger being formed with a cone shaped reduced portion intermediate its ends adapted in its various positions to coact with said inlet port for varying the resistance to a flow of fluid therethrough; a coiled spring member for urging said plunger in one direction; fluid pressure means acting upon said plunger at a point isolated from said cone shaped portion for urging the plunger in a direction opposed to the action of said spring member; means for controlling the initial tension of said spring; and means for varying the increment of deflection of said spring for a predetermined change in fluid pressure thereby to render said valve adaptable to be automatically opened any predetermined amount for each unit change in pressure subsequently occurring.

12. A valve mechanism adapted for controlling a flow of fluid combining, a casing member provided with inlet and outlet ports; a plunger element reciprocably mounted therein, said plunger being formed with a cone shaped reduced portion intermediate its ends adapted in its various positions to coact with one of said ports for varying the resistance to a flow of fluid therethrough, said cone shaped portion cooperating with the wall of said casing to provide a passageway diverging in the direction of flow; a yieldable member for urging said plunger in one direction; a fluid pressure conduit connectible to one of said ports and means isolated from said ports and responsive to the pressure of the fluid in said conduit for urging the plunger in a direction opposed to the action of said yielding member; means for adjusting the tension of said yielding member so that the normal pressure of the fluid in said conduit will move said plunger a predetermined distance with respect to said ports; and means for varying the effect of a subsequently occurring unit change in fluid pressure upon the increment of further movement of said yieldable member thereby to effect a change in flow of any desired amount through the valve mechanism for a given change in said normal pressure.

HANS ERNST.